M. E. MOREAU.
SOLAR HEATING DEVICE.
APPLICATION FILED AUG. 28, 1920.

1,424,932.

Patented Aug. 8, 1922.
3 SHEETS—SHEET 1.

Inventor
Marcel Eloi Moreau
By Arthur P. Lee
Atty.

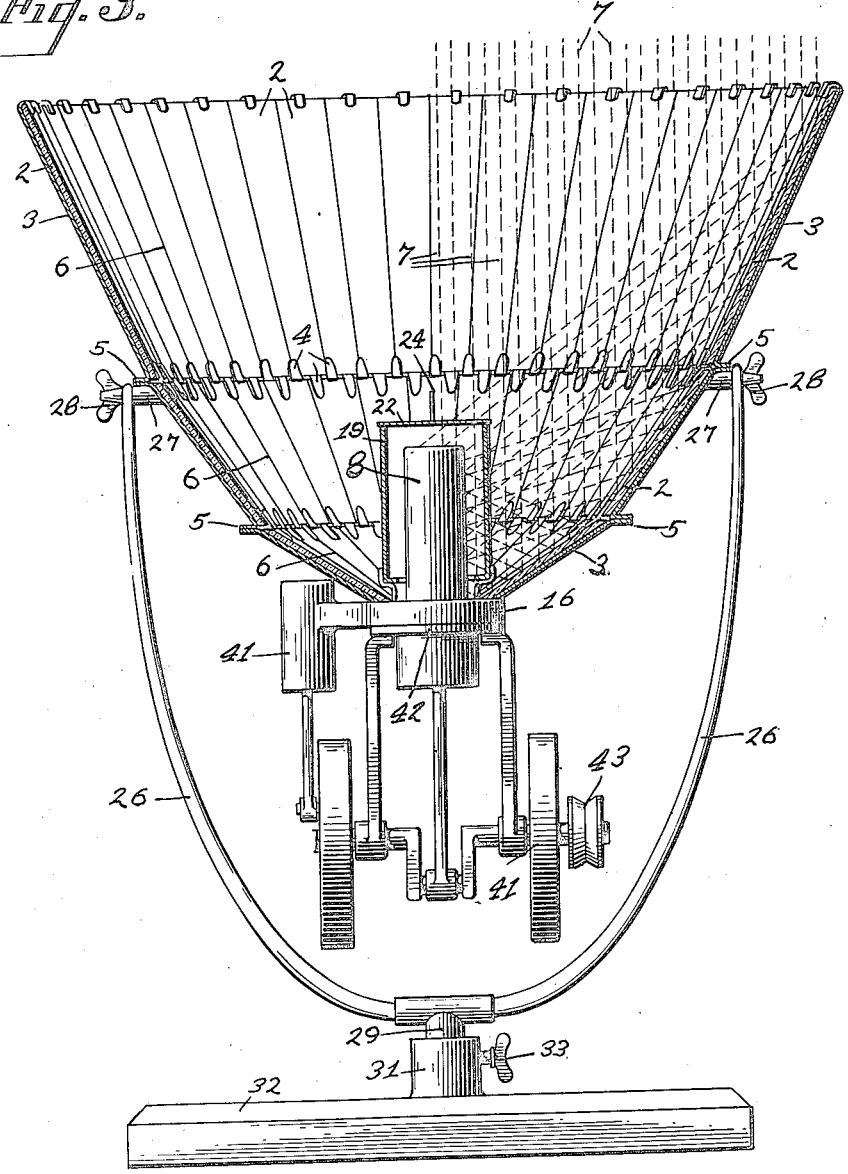

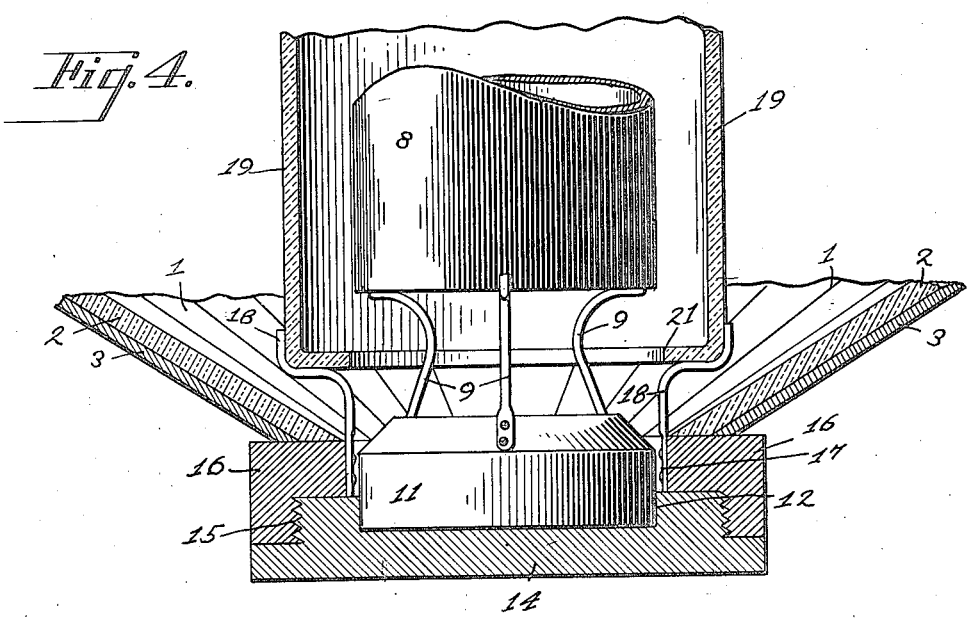
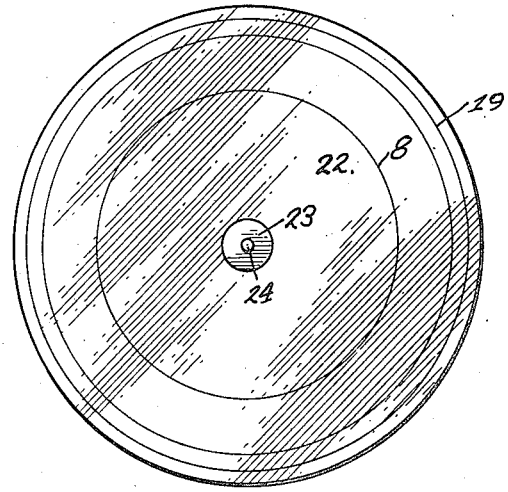
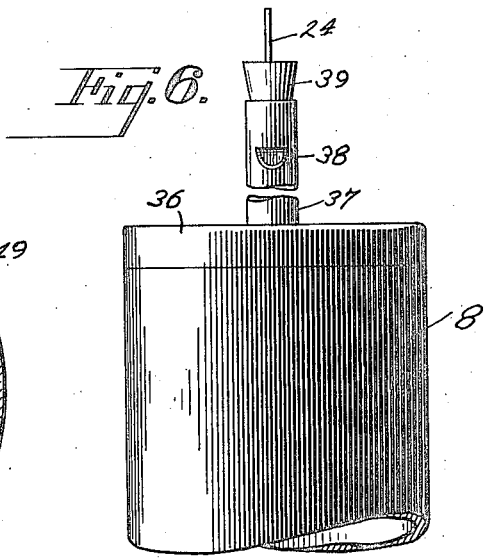

UNITED STATES PATENT OFFICE.

MARCEL ELOI MOREAU, OF SAN FRANCISCO, CALIFORNIA.

SOLAR HEATING DEVICE.

1,424,932.     Specification of Letters Patent.     Patented Aug. 8, 1922.

Application filed August 28, 1920. Serial No. 406,736.

*To all whom it may concern:*

Be it known that I, MARCEL ELOI MOREAU, a citizen of the United States, residing in the city and county of San Francisco and State of California, have invented a new and useful Improvement in a Solar Heating Device, of which the following is a specification.

My invention relates to improvements in solar heating devices wherein a reflector operates in conjunction with a heat absorbing member to concentrate and utilize heat from the rays of the sun.

The primary object of my invention is to provide an improved solar heating device.

A further object of my invention is to provide an improved device adapted to reduce loss of heat by outward radiation.

A further object is to provide a device of the character described having improved means for adjustment to present the greatest reflective surface to the sun's rays at different periods of the day.

A still further object is to provide means for supporting heating members of various characters whereby the energy absorbed may be applied in different ways.

A still further object is to provide a reflector adapted to reflect rays upon all surfaces of a heat absorbing member.

I accomplish these and other objects by means of the novel device disclosed in the drawings forming a part of the present specification wherein like characters of reference are used to designate similar parts throughout said specification and drawings, and in which:

Fig. 3 is a side elevation of my invention partly in section, disclosing the concentration of rays upon the cylinder of an air engine for the performance of useful work.

Fig. 4 is an enlarged vertical section of a portion of my invention disclosing one manner in which the heat absorbing member may be removably supported to occupy the focal area within the reflector.

Fig. 5 is an enlarged plan view of the transparent jacket enclosing the heating member.

Fig. 6 is an enlarged broken side elevation of a heating member adapted for use in boiling liquids.

Figure 1:
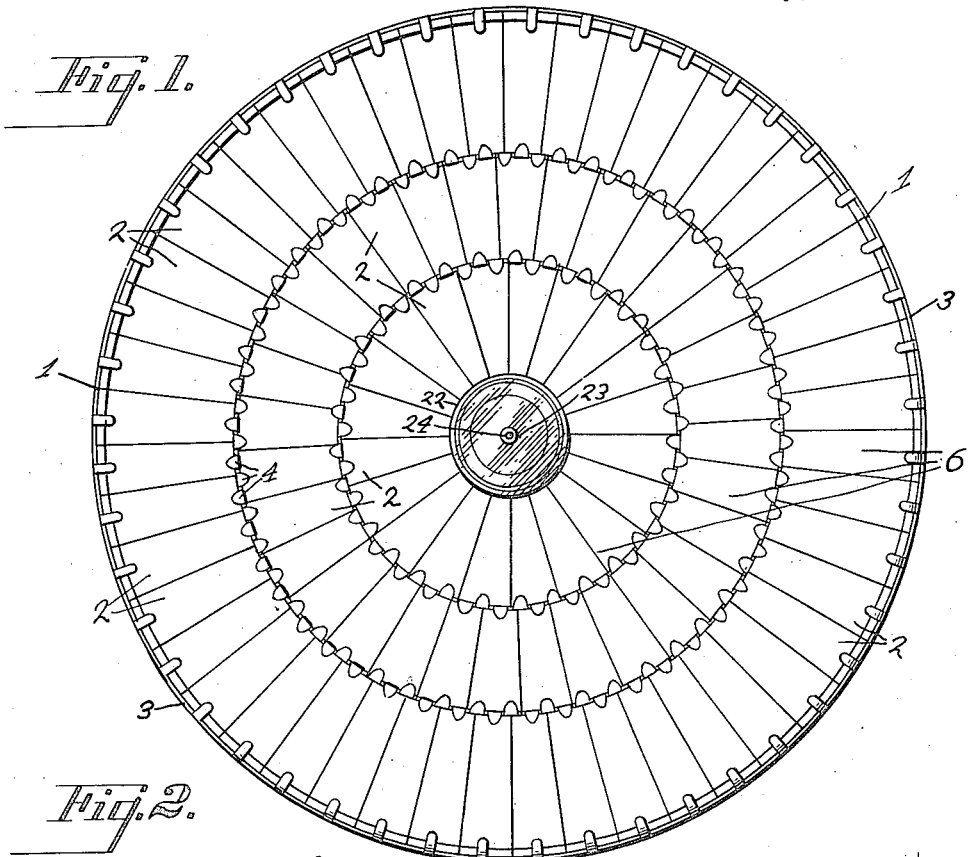
Fig. 1 is a plan view of my improved solar heating device.

Referring to the drawings the numeral 1 is used to designate in general a reflector formed from a plurality of plane mirrors, 2, removably secured upon the inner surface of a housing 3 by inwardly bent tabs 4 or other suitable securing means whereby a broken mirror 2 may be readily replaced. The mirrors 2 are arranged in a plurality of annular series 6 converging symmetrically about a central axis, the lower annular series or rings 6 of mirrors 2 being arranged to converge at successively greater angles from the vertical than the upper series 6. Sun rays 7 will be reflected by each series 6 of mirrors 2 at an angle adapted to concentrate all rays striking the mirrors within a limited focal area centrally disposed within the lower portion of the reflector 1.

Figure 2:
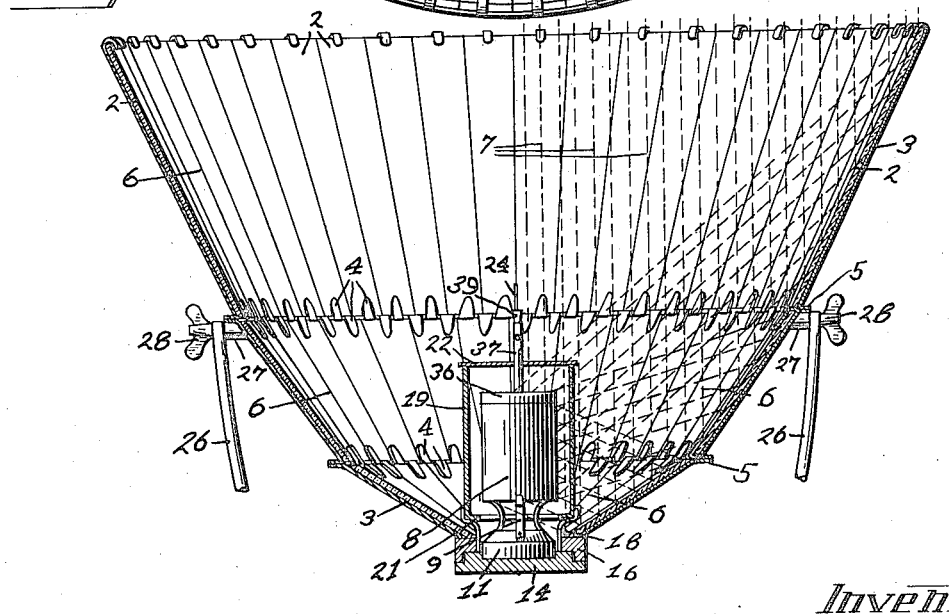
Fig. 2 is a broken vertical section of the device disclosed in Fig. 1, disclosing the manner in which the rays of the sun are concentrated on the heat absorbing member.

A heating member 8 is removably mounted upon spring wire supports 9 at such a position as to occupy the focal area of the reflector 1 and receive rays 7 reflected from the annular series 6 of mirrors 2 upon the top, bottom and sides thereof as disclosed in Fig. 2 of the drawings. The surface of the member 8 should be of an unpolished character and is preferably covered with a slight coating of lamp black or other heat absorbing material to prevent reflection of the rays 7 from the surface of the member 8.

The wire supports 9 are secured at their lower ends to a supporting base 11 engaging a recess 12 provided in a flanged cap 14 threaded to engage a threaded counter bore 15 provided in a collar 16 secured to the lower portion of the reflector 1, an aperture 17 being provided in the collar 16 to permit passage of the heating member 8 therethrough.

Spring wire supports 18 secured to the collar 16 support a cylindrical jacket 19 arranged to removably enclose the heat absorbing member 8, an aperture 21 being provided in the bottom thereof to permit entrance of the member 8 thereinto. The jacket 19 is made of glass or other transparent material adapted to prevent loss of heat by radiation and contact with the colder air outside the jacket 19 without interfering with the passage of the reflected rays 7 therethrough. A transparent cover 22 is provided for the jacket 19, said cover 22 having an opaque spot 23 centrally disposed upon the upper surface thereof. A pointer 24 is secured at the approximate center of said opaque spot 23 and arranged perpendicular to the cover 22 and co-axial with the axis of the reflector 1, for a purpose hereinafter explained.

The reflector 1 is rotatably mounted upon a bifurcated bracket 26 engaging bearings 27 secured upon diametrically opposed sides of the housing 3. Thumb nuts 28 are provided upon the ends of the bearings 27 for retaining the reflector at any desired inclination from the vertical. The bracket 26 is rotatably mounted about a vertical axis by means of a bearing 29 provided at the lower end thereof engaging a socket 31 provided upon a supporting base 32, a thumb screw 33 being provided for securing the bracket in any desired position. By means of the bearings 27 and 29 the reflector 1 may be rotated about either a horizontal or vertical axis thereby becoming adjustable to any desired rotated or inclined position whereby the greatest reflective area may be exposed to the rays of the sun at any time of the day. As the mirrors 2 are symmetrically arranged about an axis the greatest reflective area will be obtained when the axis of the reflector 1 is parallel to the sun's rays. This position is obtained by adjusting the reflector to the desired position by rotation about the bearings 27 and 29 and is indicated by the absence of any shadow cast by the pointer 24 upon the opaque spot 23 on the jacket cover 22.

The housing 3 may be formed in annular sections corresponding with the series 6 of mirrors 2, flanges 5 being provided upon registering edges of adjacent sections for assembling.

In Fig. 2 I have illustrated a heat absorbing member 8 in the form of a container adapted to contain a liquid or other product to be subjected to heat. In this instance I have provided a cover 36 for the member 8 having a tube 37 extending outwardly from the center through a suitable aperture in the cover 22 for the escape of steam or other volatile matter. The tube 36 may be provided with an aperture 38 arranged to form a whistle sounded by the escape of steam or vapor to signal the boiling of a liquid within the container 8. A cork closing the outer end of the tube 36 should be provided with the indicator 24, the surface of the cork 39 replacing the opaque spot 23 in adjusting the position of the reflector 1 as best illustrated in Fig. 6 of the drawings.

In operation the reflector 1, adjusted to present the greatest reflective area to the sun, receives the rays upon the mirrors 2, said rays being reflected upon the heat absorbing surface of the member 8. As the rays striking the entire reflective surface are concentrated upon the member 8 and absorbed thereby the heat normally distributed over the entire area of the reflector is likewise concentrated within the member 8 with a resultant rise in temperature within the member 8, loss through outward radiation of heat being reduced to a negligible quantity by the jacket 19. The mirrors 2 are made of a width slightly less than the diameter of the member 8 and inclined at an angle adapted to reflect rays directly upon the entire surface of the member 8. In this manner all rays entering the reflector are concentrated directly upon the heat absorbing member 8 without loss by a second reflection. The degree of heat obtainable by a device wherein the reflective surface bears the ratio to the heat absorbing element disclosed in the drawings is approximately 500 degrees F. Greater heating capacity is obtainable by increasing the area of the reflective surface.

In Fig. 3 I have illustrated my invention in connection with an air engine 41, the cylinder of which constitutes the heat absorbing member 8 within the jacket 19. The absorption of heat in this instance is identical with that above described, the energy in this case being applied in performing useful work. The engine is secured to a cap 42 threaded to the collar 16 as in case of the use of a receptacle 8 as in Fig. 2. In this manner the heat absorbing member 8 becomes interchangeable thereby permitting the reflector to be employed for various purposes. The engine 41 is provided with the usual pulley 43 whereby the power may be utilized in any desired manner.

It is obvious from the foregoing disclosure that the heat absorbing member 8 may be varied in an infinite number of ways as for instance to form the heating surface of an instantaneous steam generator, or as a crucible for the melting of metals or the like. My invention is of further utility in carrying out certain chemical reactions wherein a high degree of light and heat are required. As the details of construction of the device and the application of the principle involved is capable of wide variation, I do not wish to limit myself to the specific constructions disclosed but prefer to avail myself of all such modifications as may fall within the scope of the appended claims.

Having thus described my invention what I claim as new and desire to secure by Letters Patent is:

1. A solar heating device comprising a housing; a plurality of plane reflecting surfaces symmetrically mounted in converging relation about an axis and arranged in a plurality of annular series of different inclinations to focus rays from the sun upon a focal area; and tabs formed upon the housing and arranged to be turned inwardly to engage said reflecting surfaces for retaining the same in operative position upon the housing.

2. A solar heating device comprising a housing formed in a plurality of sections arranged to be connected in superimposed position; a plurality of plane reflecting surfaces symmetrically mounted upon the inner side of each section, the surfaces of each section converging at different angles to reflect rays upon all portions of a focal area within the reflector; and tabs formed upon the edges of the housing sections to engage the edges of the reflecting surfaces to retain the same in operative position.

3. A solar heating device comprising a cup shaped reflector arranged to reflect rays from the sun upon a focal area within the reflector; a collar mounted at the bottom of the reflector; a cap removably engaging said collar; and means mounted upon said cap and removable through said collar for engaging a heat absorbing element and holding the same within said focal area.

In witness whereof I hereunto set my signature.

MARCEL ELOI MOREAU.